United States Patent [19]

Kaniaris

[11] Patent Number: 4,871,144

[45] Date of Patent: Oct. 3, 1989

[54] REGULATOR KEY

[76] Inventor: John Kaniaris, 6347 Castle Hill Dr., Middletown, Ohio 45044

[21] Appl. No.: 309,885

[22] Filed: Feb. 14, 1989

[51] Int. Cl.$^4$ .............................................. F16K 31/60
[52] U.S. Cl. .................................... 251/291; 285/39; 285/198
[58] Field of Search ...................... 251/291; 137/382.5; 285/39, 198

[56] References Cited

U.S. PATENT DOCUMENTS

| | | | |
|---|---|---|---|
| 997,362 | 7/1911 | Bamanshaw | 251/291 |
| 1,484,108 | 2/1924 | Zoltowski | 285/198 |
| 1,687,768 | 10/1928 | Heidbrink | 285/198 |
| 1,855,586 | 4/1932 | Nordstrom | 251/291 |
| 2,169,082 | 8/1939 | Stevens et al. | 285/198 |
| 2,350,354 | 6/1944 | Herskovits | 251/291 X |
| 3,606,390 | 9/1971 | Taylor | 285/198 X |
| 3,929,152 | 12/1975 | Graham | 251/291 X |

OTHER PUBLICATIONS

Portable O$_2$ Accessories—990002 Wrench—Puritan-Bennett Catalog—Lenexa, Kansas.

*Primary Examiner*—John Rivell
*Attorney, Agent, or Firm*—Wood, Herron & Evans

[57] ABSTRACT

A key for operating a regulator-flow meter assembly used with medical gas cylinders. The regulator-flow meter assembly includes a main valve having a flat stem and a rotatable yoke. The key comprises an elongated metal block having a first elongated opening adapted to fit over the main valve stem. The elongated opening is disposed at an angle to the axis of the block and is located adjacent to one end of the block. The block also includes a second opening of circular cross-section adapted to fit over the yoke and a third opening adapted to receive a key chain.

3 Claims, 1 Drawing Sheet

REGULATOR KEY

This invention relates to operating keys and is particularly directed to a key for use with medical gas regulator and flow meter apparatus.

BACKGROUND OF THE INVENTION

In hospitals and other institutions, it is commonplace to utilize compressed medical gas such as oxygen, nitrous oxide or air. This gas is often stored under high pressure in cylinders. Conventionally, the head of a compressed gas cylinder is connected to a unitary regulator-flow meter assembly. The regulator-flow meter assembly usually includes a main valve for closing off the flow of gas from the cylinder or opening the gas line to permit gas to flow from the cylinder to the regulator. When the main valve is open, gas flows from the regulator through the flow meter to a tube by means of which it is conveyed to the point of use.

The main valves of regulator-flow meter assemblies are normally provided with an upstanding flat stem which is rotated to open or close the valve. In addition, the usual regulator-flow meter assembly includes a yoke or handle in the form of a cylindrical rod mounted to extend transversely of a rotatable shaft. This yoke is turned to securely seat the assembly on the gas cylinder and provide a gas-tight seal.

In the past, nurses, orderlies, respiratory technicians, therapists and other operators of this type of equipment have been provided with elongated key members for opening and closing the main valve. These elongated key members are provided with elongated openings adapted to fit over the flat valve stem. On of these openings is aligned with the longitudinal axis of the key while the second opening is arranged at right angles to the axis of the stem.

Such prior art keys have been subject to a number of disadvantages, despite which the the basic design of the key has remained the same over a period of many years.

The first disadvantage of prior art keys is that users tend to insert the cylindrical yoke in one of the elongated openings so that the key can be used for turning the regulator yoke. This causes two problems. In the first place, the elongated openings in the key are deformed after a period of use so that they no longer properly engage the stem of the main valve, but rather slip relative to the stem, rendering the key useless for opening and closing the main cylinder valve. In addition, the engagement of the elongated slot with the cylindrical handle results in an appreciable bending torque being applied to the yoke with the result that the yokes, on occasion, have become badly bent or the seals compressed by turning the yoke have been damaged.

Another disadvantage of prior keys is that they are relatively large and are normally carried loose in the operator's pocket, with the result that the keys are frequently misplaced or lost.

SUMMARY OF THE PRESENT INVENTION

The present invention is predicated in part on the concept of providing a compact key which is effective to actuate a conventional regulator-flow meter assembly but which minimizes the likelihood that either the key or regulator assembly will be damaged. To this end, the key is formed as a bar of rectangular cross-section and is provided with a single elongated opening for receiving the main valve stem, a second circular opening for receiving the yoke and facilitating turning of the yoke without deformation of the elongated slot, or bending of yoke, or damaging any seal, and a third small remote opening permitting mounting of the key on a key chain or the like to minimize the possibility that the key would be lost or misplaced.

In accordance with the present invention, the single elongated opening is formed adjacent to one end of the key and is formed with the axis of the opening at an acute angle to the longitudinal axis of the key. I have found that this single angulated slot permits the key to engage and rotate the stem in any position. This permits the key to be made considerably more compact and lessens the possibility of deformation of the slot, as was common, and the narrow band previously provided between the two elongated slots, all without adversely affecting the utility of the key.

In a preferred embodiment of the present key, a second opening of circular cross-section is provided spaced from the elongated opening toward the center of the key. This second opening is a yoke receiving opening which snugly fits over the yoke. The provision of this second opening eliminates any need for the operator to use the elongated opening for operating the yoke and minimizes the possibility that that elongated opening would be deformed by using it to turn the regulator yoke.

One advantage of the present key is that it is compact and can readily be mounted on a key chain so that it can be carried by an operator without danger of losing the key. A second advantage of the present key is that it is not subject to damage as a result of the use of the elongated opening to operate the regulator yoke. Nor is the use of the present key as likely to result in operator bending the regulator yoke or damaging seals as has been the case in the past.

These and other advantages of the present invention will be more readily understood from a consideration of the detailed description of the drawings illustrating a preferred embodiment of the invention.

DETAILED DESCRIPTION OF THE DRAWINGS

Figure 1:
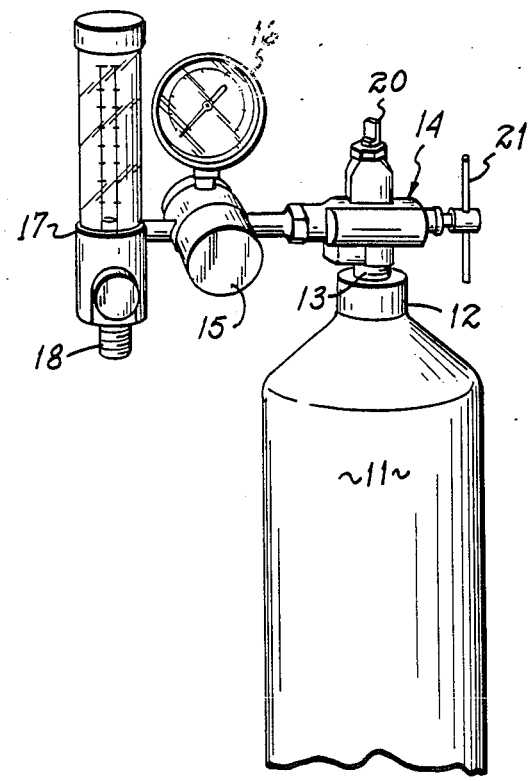
FIG. 1 is a perspective view of a conventional gas cylinder coupled to a pressure regulator and a flow meter.
Figure 2:
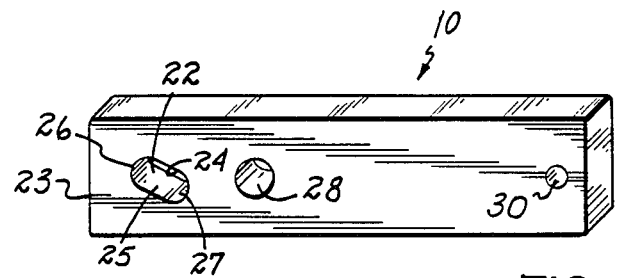
FIG. 2 is a perspective view of a preferred form of regulator key constructed in accordance with the principles of the present invention.

A preferred form of regulator key 10 is illustrated in FIG. 2. This key is intended for use with medical gas regulator-flow meters of the type illustrated in FIG. 1.

FIG. 1 shows a medical gas cylinder 11 of the type adapted to store a gas such as oxygen, air or nitrous oxide under high pressure. The cylinder head 12 carries a threaded nipple 13. This nipple supports a unitary regulator-flow meter assembly. In a typical regulator-flow meter assembly of the type shown in FIG. 1, a cut-off valve construction is mounted in a housing 14. The outlet of this valve is connected to a regulator 15 including a pressure gauge 16 and a flow meter 17 having a threaded nipple 18 adapted to be connected to tubing for conveying the gas to its intended point of use.

In one conventional form of regulator flow meter apparatus, the main valve is provided with an upstanding flat stem 20 which can be rotated to open the valve permitting gas to flow from the cylinder to the regulator or to close off the flow of gas from the cylinder 11. In addition, a yoke 21 is provided for adjusting the sealing of the regulator assembly on cylinder 11 to insure that the seals (not shown) provide a gas tight seal. It is to be understood that the construction of cylinder 11, the main valve, regulator 15 and flow meter 17 are well known and constitute no part of the present invention which is concerned solely with key 10 for operating valve stem 20 and turning yoke 21.

In a preferred form, key 20 comprises a block of rectangular cross section and of small enough dimensions to readily fit in the operator's pocket. In a preferred form, this key is made of a material such as aluminum. One convenient size of block is 3¼" long by ¾" wide by ¼" in height. An elongated opening 22 is formed adjacent to one narrow end 23 of the block. Opening 22 preferably includes two flat opposed walls 24 and 25 and two semi-circular end walls 26 and 27. The overall dimensions of opening 22 are such that the opening snugly receives stem 20 when the key is placed over the stem. As is apparent from FIG. 1, the longitudinal axis of opening 22 is disposed at an acute angle to the longitudinal axis of key 10.

Key 10 further includes a circular opening 28 of a size adapted to snugly receive yoke 21. This opening is spaced from opening 22 toward the center of the key. Thus, the key can be used to assist in opening and closing yoke 21 by placing the key over the yoke with the yoke passing through opening 28. However, the torque is considerably less than if the yoke were in opening 22. The key 10 can also be used to open and close main valve by placing the key over stem 20 with the stem being snugly received within opening 22.

In addition to openings 22 and 28, the key 10 is provided with a third opening 30 of a diameter substantially less than opening 28. Opening 30 is adapted to receive a key chain or the like. It will be appreciated that by placing the key 10 on a key chain, the operator can readily carry the key with him without danger of losing the key.

Having described my invention, I claim:

1. A key for use with a medical gas regulator-flow meter assembly of the type having a main valve including a flat stem and a yoke which can be turned to seat the assembly on a cylinder, said key comprising:
    an elongated body having a longitudinal axis,
    a first elongated opening having two opposed flat walls, said elongated opening being adapted to snugly receive the stem of said main valve, said flat walls of said elongated opening being disposed at an acute angle to the longitudinal axis of said body, and
    a second opening of circular cross-section, said second opening being dimensioned to snugly receive the yoke of said regulator, said second opening being spaced from said first opening toward the mid portion of said key.

2. The key of claim 1 further comprising a third opening of circular cross-section formed in said body adjacent to an end thereof remote from said elongated opening, said third opening being of substantially smaller diameter than said second opening and being adapted to receive a key chain.

3. The regulator key of claim 2 in which said key body is formed of a metal bar of substantially rectangular cross-section.

* * * * *